(12) United States Patent
Bayer

(10) Patent No.: US 9,098,780 B1
(45) Date of Patent: Aug. 4, 2015

(54) METHOD FOR THE PRODUCTION OF A SECURITY CARD, AND A CORRESPONDING SECURITY CARD

(71) Applicant: ATLANTIC ZEISER GmbH, Emmingen (DE)

(72) Inventor: Friedbert Bayer, Engen (DE)

(73) Assignee: ATLANTIC ZEISER GmbH, Emmingen (DE)

( * ) Notice: Subject to any disclaimer, the term of this patent is extended or adjusted under 35 U.S.C. 154(b) by 0 days.

(21) Appl. No.: 14/507,297

(22) Filed: Oct. 6, 2014

(30) Foreign Application Priority Data

Mar. 11, 2014 (DE) .......................... 10 2014 204 391

(51) Int. Cl.
*G06K 19/02* (2006.01)

(52) U.S. Cl.
CPC .............. *G06K 19/02* (2013.01); *G06K 19/022* (2013.01)

(58) Field of Classification Search
CPC ..... B42D 15/10; G06K 19/077; G07F 7/1008
USPC ................................................. 235/488, 487
IPC ........ B42D 15/10; G06K 19/077; G07F 7/1008
See application file for complete search history.

(56) References Cited

U.S. PATENT DOCUMENTS

| 4,897,533 A * | 1/1990 | Lyszczarz ..................... 235/487 |
| 8,257,819 B2 | 9/2012 | Tompkin et al. |
| 2010/0253059 A1 | 10/2010 | Hansen et al. |

FOREIGN PATENT DOCUMENTS

| DE | 102007005414 A1 | 8/2008 |
| DE | 102007052174 A1 | 5/2009 |

* cited by examiner

*Primary Examiner* — Karl D Frech
(74) *Attorney, Agent, or Firm* — Alston & Bird LLP

(57) ABSTRACT

A method for the production of a security card (1) having a card body (2) and a film (3) which is irreversibly attached to the card body (2) is provided. The method comprises the steps of: provision of the card body (2); provision of the film (3), wherein at least one of a side or a surface of the film (3) that faces the card body (2) is at least slightly smaller than at least one of a side or a surface of the card body (2) that faces the film (3); coating of at least one of the card body (2) or the film (3) with a transparent adhesive agent (4); at least one of combining or pressing of the card body (2) and the film (3) such that an edge region (5) of the surface of the card body (2) which is not covered by the film (3) is also covered by a layer of the adhesive agent (4), and the edges of the film (3) are at least one of enclosed by or embedded in the adhesive agent (4); and curing of the adhesive agent (4) by an application of electromagnetic waves.

14 Claims, 2 Drawing Sheets

METHOD FOR THE PRODUCTION OF A SECURITY CARD, AND A CORRESPONDING SECURITY CARD

CROSS REFERENCE TO RELATED APPLICATIONS

Figure 1:
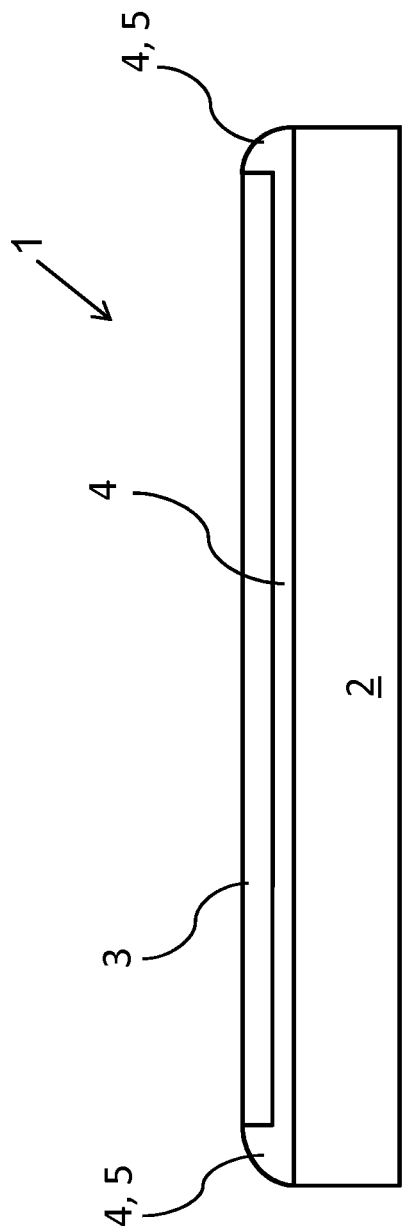

This application claims priority to and the benefit of German Application No. 10 2014 204 391.3, filed Mar. 11, 2014, the contents of which as are hereby incorporated by reference in their entirety.

BACKGROUND

1. Technical Field

The invention relates to a method for the production of a security card, particularly a finance card or a card for the purpose of identification, preferably an ID card, wherein the same is a personal identification card or another identification card, access authorization card, etc., by way of example, and the security card has a card body and a film which is irreversibly attached to the card body. In addition, the invention relates to a corresponding security card.

2. Description of Related Art

The security cards addressed here can be, by way of example, a finance card—meaning a cash card, money card, debit card, credit card, or other card which serves as a method of payment. In addition, the term 'security card' also means a card used for the purpose of identification—for example an ID card, a personal identification card, another identification card, or an access authorization card. These security cards can particularly be plastic cards.

Such security cards have a card body which is imprinted for the purpose of personalization, and/or which is configured with security elements which serve the purpose of providing protection against counterfeit. These can be, by way of example, holograms or visually- and/or electronically readable information. After being personalized and/or after being equipped with other visually- and/or electronically readable information, the card bodies are covered by a transparent and/or holographic film. This serves as protection for the card body and for the information on the same, and also serves as protection against counterfeit.

For the purpose of attaching the film to the card body in an irreversible manner, a method is used whereby a transparent hot melt adhesive functions as an adhesive between the card body and the film, at a very high temperature. The transparent adhesive is most commonly placed on the film, which is pressed onto the card body by the application of temperature and pressure.

In addition, the practice is known in the prior art of irreversibly attaching the film to the card body by means of an adhesive agent which cures when electromagnetic waves are applied to the same.

In the production method which defines the class, and in the case of the security cards which are produced using said method, it is problematic that the film attached to the card body can become detached from the card body. This is due in no small part to the heavy loads which such cards are subjected to during everyday use.

By way of example, finance cards are carried by the owner in a wallet, and repeatedly inserted into a corresponding compartment of the wallet. In addition, such finance cards are inserted into—among other things—automatic teller machines. As a result, the security cards are subjected to strong mechanical loads by the repeated impacts—particularly along their edge regions. This leads to a separation of the film from the card body after a certain amount of time.

In addition, it is problematic with the known security cards that the edges, in particular, of the film offer a point of engagement for detaching the film from the security card. As such, the known security cards are only protected against counterfeit to a limited degree.

BRIEF SUMMARY

For these reasons, the present invention addresses the problems of designing and implementing a class-defining method for the production of a security card, as well a class-defining security card, in such a manner that it is possible to produce a security card which is able to resist mechanical loads, and is protected against counterfeiting, with a quick cycle turnaround and with low inputs of time and energy.

The problem above is addressed according to the invention by a method for the production of a security card having the features of the claims.

According to the features of the claims, the method according to the invention is characterized by the following method steps:

First, the card body is provided, which will be coated with the film. This can be designed as a plastic card, by way of example. The card body can be provided in any manner—for example from a magazine or a storage depot. From this location, it can be further conveyed as needed.

The film is provided in a subsequent step. Here it is essential that the film is at least slightly smaller than the card body. This specifically means that the side or surface of the film which faces the card body is at least slightly smaller than the side or surface of the card body which faces the film.

Next, the card body and/or the film is/are coated with a transparent adhesive agent which cures upon the application of electromagnetic waves. The adhesive agent can be a two-component glue, wherein the two components can react with each other upon the application of electromagnetic waves. As an alternative, it can be contemplated that the film provided in the previous step is already coated with a thin layer of the transparent adhesive agent which cures upon the application of electromagnetic waves.

Next, the card body and the film are brought together in such a manner that an edge region of the surface of the card body which is not covered by the film is also covered by a layer of the adhesive agent, and the edges of the film are enclosed by the adhesive agent and/or are embedded in the adhesive agent. In the process, the card body can be pressed together with the film. In this case, it is essential that the film does not cover the card body all the way directly up to the edge of the card body—that is, does not end at the edge of the card body; rather, the edges of the film are enclosed by the adhesive agent. The adhesive agent therefore protects the film if the edge of the security card experiences an impact. As such, in a surprisingly simple manner, a configuration is achieved wherein the film remains fixed to the card body even after a longer period of use of the security card. A further advantage is that the edges of the film do not offer any point of engagement for detaching the film from the card body. As such, the security cards according to the invention offer a high degree of protection against counterfeit.

Next, the adhesive agent is cured with the application of electromagnetic waves, particularly the application of light. In this way, an irreversible covering of the card body is created by the film. Whatever information may be present on the card body can be visible through the transparent film. In this case, it can be contemplated that electromagnetic waves are applied to the adhesive agent through the film and/or through the card body, for the purpose of curing the same.

The adhesive agent is advantageously applied to the card body and/or to the film by means of digital printing. This can be performed by way of example via a so-called drop-on-demand process. As such, the adhesive agent can be applied in any geometry and layer thickness onto the card body and/or the film. In a particularly advantageous manner, a UV-curable glue is used as the adhesive agent. This brings the advantage that it cures extremely quickly with appropriate irradiation—and particularly under more-or-less cool conditions.

The adhesive agent can be applied in a special gluing station. For this purpose, it can be contemplated that the card body and/or the film is/are guided to the gluing station—preferably linearly—to be configured there with the adhesive agent. Next, or alternatively, the card body and/or the film is/are likewise guided—preferably linearly—to a joining station which is arranged downstream of the gluing station, where the film is applied to the card body by the action of the adhesive agent.

The card body is personalized by means of digital printing, in a particularly advantageous manner. This can be performed by means of a drop-on-demand process, by way of example. As an alternative or in addition thereto, information can be marked on the card body by means of a laser. This can be a grayscale laser, by way of example. As such, personalization and/or marking of the card body is made possible by constructively simple measures, before the card body is irreversibly attached to the film—or subsequently by means of laser through the film and the adhesive agent [sic].

As far as the film is concerned, it can be contemplated that the same is provided on a film carrier—preferably continuously. The film which serves the purpose of providing a covering could be provided as individual patches on the film carrier. The film patches in this case have a specific size such that the side or surface of the film patches which faces the card body is at least slightly smaller than the card body. It can accordingly be contemplated that the film carrier which carries the film and/or the film patches is guided to a gluing station for the purpose of coating with the adhesive agent, such that the adhesive agent is applied at this point to the film and/or to the film patches. This can be performed in place of the application of the adhesive agent to the card body, or in addition thereto. If it is only intended for the film and/or the film patches to be coated with the adhesive agent, the amount of the adhesive agent and/or the layer thickness of the adhesive agent can be selected in such a manner that the adhesive agent escapes on the side edges of the film as a result of the pressing of the film and the card body together, such that the edges of the film are enclosed by the adhesive agent and/or are embedded in the adhesive agent.

To make it possible for the film and/or the film patches to be removed as easily as possible from the film carrier, a separation layer can be included between the film carrier and the film. The film and/or the film patches can be a transparent film and/or holographic film. These are particularly suitable because they are transparent to electromagnetic waves and particularly counterfeit-proof.

The film carrier can be detached and/or separated from the film and/or from the film patches at a "flat angle". It is advantageous in this case if the film carrier is deflected in such a manner that the film carrier is deflected around a "hairpin" bend. The deflection can particularly be at an angle of 135° to 200°, by way of example. Such a deflection can be performed by means of a roller device. The roller device can be arranged directly or indirectly downstream of a curing station.

In order to achieve a precise positioning of the card body and the film and/or film patch with respect to each other, the position of the card body and/or the film and/or the film patches can advantageously be detected. The film and/or the film patch can be exactly positioned on the card body using the position data. By way of example, an edge of the card body can be detected via a sensor for this purpose. In other words, the card body and the film and/or the film patches can be synchronized to each other.

In a particularly advantageous manner, the film has a cover layer and a security layer. The cover layer can be designed as a PET layer, by way of example. The separation layer can be constructed between the cover layer and the film carrier. In a particularly advantageous manner, the film carrier is designed as a PET layer.

The security layer can be constructed as a lacquer coat. The security layer can additionally have a metalized stamping for the purpose of increasing the counterfeit protection of the security card.

Pairs of rollers arranged opposing each other, or also flat press dies, can be used for the purpose of pressing the arrangement of the card body with the film applied to the card body and the adhesive agent positioned between the same, with at least some pressing force. It is essential in this process that, following the pressing, an edge region of the surface of the card body which is not covered by the film is also covered by a layer of the adhesive agent, and the edges of the film are enclosed by the adhesive agent and/or are embedded in the adhesive agent. In this case, following the pressing, or also during the pressing or also between individual steps of the pressing, the arrangement of the card body with the film applied to the card body and the adhesive agent positioned between the same is exposed to irradiation with electromagnetic waves, particularly light, and preferably through the film carrier and the film. UV light is used, in an ideal manner, for the irradiation. It can also be contemplated that the curing of the adhesive agent is initially only performed partially, to then subject the arrangement to a pressing and then a further irradiation and final curing. Any number of other sequences of the individual work steps can be contemplated.

The film can be provided in individual pieces, such that the same are guided to a gluing station and/or a joining station—each individually.

If the film which serves the purpose of providing a coating—by way of example as film patches—is provided via a film carrier, it is particularly advantageous if the film carrier is removed from the film and/or the film patch connected to the card body, prior to, during, or after the curing of the adhesive agent. In this way, the film carrier, as a continuous web, can be removed from the arrangement and/or from the card body, and rolled on a downstream roller for disposal purposes. In parallel to this process, the coated card body can be conveyed further—preferably linearly—for further manipulation and/or processing.

In addition, it can be contemplated that the film and/or the film patches are processed prior to the application on the carrier. As such, the film could be lasered, perforated, stamped, or otherwise processed. In particular, it can be contemplated that the film is imprinted—preferably on the side facing the card body, prior to the application to the card body.

The problem on which the invention is based is further addressed by a security card having the features of the claims. The claims in particular define defines a security card which has a card body and a film which is irreversibly attached to the card body, wherein an edge region of the surface of the card body which is not covered by the film is also covered by a layer of a transparent adhesive agent which cures upon the application of electromagnetic waves, and the edges of the film are enclosed by the adhesive agent and/or are embedded in the adhesive agent, said security card being produced according to a method according to one of the claims.

DETAILED DESCRIPTION OF THE DRAWINGS

Figure 2:
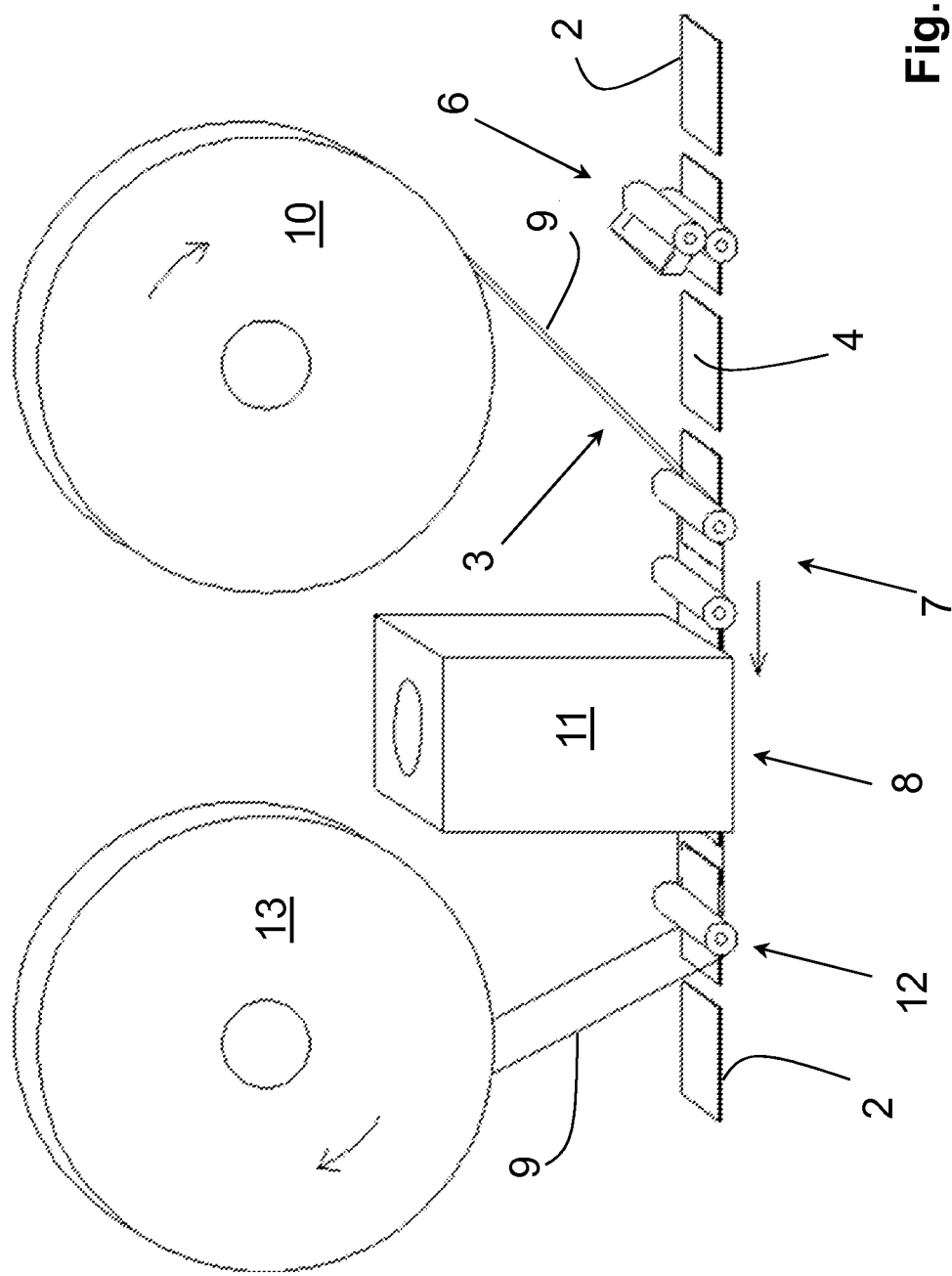

At this point, there are various possibilities for designing and implementing the teaching of the present invention in an advantageous manner. Reference is made for this purpose, on the first hand, to the dependent claims, and on the other hand to the following explanation of a preferred embodiment of the invention with reference to the drawing. In combination with the explanation of the preferred embodiment of the invention with reference to the drawing, generally preferred embodiments and implementations of the teaching are explained below, wherein:

FIG. 1 shows a schematic view of one embodiment of a security card according to the invention, in a cutaway view, and FIG. 2 shows a schematic view of the basic arrangement of a device which explains the method according to the invention.

DETAILED DESCRIPTION OF VARIOUS EMBODIMENTS

A security card 1 according to the invention is illustrated in FIG. 1. The security card 1 has a card body 2. A film 3 is irreversibly attached to the card body 2 via an adhesive agent 4.

Here it can be clearly seen that the film 3 is slightly smaller than the card body 2. In addition, the adhesive agent 4 also covers the edge region 5 of the card body 2 which is not covered by the film 3. The edges of the film 3 are enclosed by the adhesive agent 4 and/or are embedded in the adhesive agent 4. As such, the edges of the film 3 are protected from impacts by the adhesive agent 4 in the edge region 5 of the security card 1. For the purpose of essentially being able to rule out an impact on the film 3, the adhesive agent 4 can be applied and cured in the edge region 5 in such a manner that it has a round and/or convex contour. As a result, there are no "sharp" edges where the security card 1 can be damaged by an impact.

FIG. 2 shows one embodiment of a device for the purpose of explaining the method according to the invention.

The device has a gluing station 6, a joining station 7, and a curing station 8.

In addition, it can be contemplated that the film 3 which serves the purpose of coating the card body 2 is provided via a film carrier 9 which is rolled off of the roll 10, which in turn serves the purpose of supplying the film 3. From there, the film carrier 9 and/or the film 3 positioned thereon—by way of example in the form of film patches—arrives immediately at the joining station 7.

In the embodiment shown here, the card body 2 is conveyed linearly to the gluing station 6, where it is coated on its surface by the transparent adhesive agent 4 by means of digital printing. From there, the card body 2 is guided to the joining station 7, where the card body 2 is combined with the film 3.

It is hereby expressly noted at this point that alternatively, or in addition thereto, the film 3 can be coated with the transparent adhesive agent 4. In addition, a film 3 which is already coated with a thin layer of the transparent adhesive agent 4 can be provided.

Following the attachment of the film 3 to the card body 2 (with the adhesive agent 4 positioned between the same), the resulting arrangement is pressed.

Next, an irradiation is performed in the curing station 8 using a UV light source 11. At this point, the adhesive agent 4 is cured, binding the film 3 to the card body 2, such that the film carrier 9 can be removed from the film 3 and/or the film patches in a downstream separating station 12, by means of deflection. From there, the film carrier 9 travels to a roll 13 which serves the purpose of disposal, by means of which the rolled film carrier 9 can be disposed.

The adhesive agent is advantageously applied to the card body and/or to the film by means of digital printing. This can be performed by way of example via a so-called drop-on-demand process. As such, the adhesive agent can be applied in any geometry and layer thickness onto the card body and/or the film. In a particularly advantageous manner, a UV-curable glue is used as the adhesive agent. This brings the advantage that it cures extremely quickly with appropriate irradiation—and particularly under more-or-less cool conditions.

The adhesive agent can be applied in a special gluing station. For this purpose, it can be contemplated that the card body and/or the film is/are guided to the gluing station—preferably linearly—to be configured there with the adhesive agent. Next, or alternatively, the card body and/or the film is/are likewise guided—preferably linearly—to a joining station which is arranged downstream of the gluing station, where the film is applied to the card body by the action of the adhesive agent.

The card body is personalized by means of digital printing, in a particularly advantageous manner. This can be performed by means of a drop-on-demand process, by way of example. As an alternative or in addition thereto, information can be marked on the card body by means of a laser. This can be a grayscale laser, by way of example. As such, personalization and/or marking of the card body is made possible by constructively simple measures, before the card body is irreversibly attached to the film—or subsequently by means of laser through the film and the adhesive agent [sic].

As far as the film is concerned, it can be contemplated that the same is provided on a film carrier—preferably continuously. The film which serves the purpose of providing a covering could be provided as individual patches on the film carrier. The film patches in this case have a specific size such that the side or surface of the film patches which faces the card body is at least slightly smaller than the card body. It can accordingly be contemplated that the film carrier which carries the film and/or the film patches is guided to a gluing station for the purpose of coating with the adhesive agent, such that the adhesive agent is applied at this point to the film and/or to the film patches. This can be performed in place of the application of the adhesive agent to the card body, or in addition thereto. If it is only intended for the film and/or the film patches to be coated with the adhesive agent, the amount of the adhesive agent and/or the layer thickness of the adhesive agent can be selected in such a manner that the adhesive agent escapes on the side edges of the film as a result of the pressing of the film and the card body together, such that the edges of the film are enclosed by the adhesive agent and/or are embedded in the adhesive agent.

To make it possible for the film and/or the film patches to be removed as easily as possible from the film carrier, a separation layer can be included between the film carrier and the film. The film and/or the film patches can be a transparent film and/or holographic film. These are particularly suitable because they are transparent to electromagnetic waves and particularly counterfeit-proof.

The film carrier can be detached and/or separated from the film and/or from the film patches at a "flat angle". It is advantageous in this case if the film carrier is deflected in such a manner that the film carrier is deflected around a "hairpin" bend. The deflection can particularly be at an angle of 135° to 200°, by way of example. Such a deflection can be performed by means of a roller device. The roller device can be arranged directly or indirectly downstream of a curing station.

In order to achieve a precise positioning of the card body and the film and/or film patch with respect to each other, the position of the card body and/or the film and/or the film patches can advantageously be detected. The film and/or the film patch can be exactly positioned on the card body using the position data. By way of example, an edge of the card body can be detected via a sensor for this purpose. In other words, the card body and the film and/or the film patches can be synchronized to each other.

In a particularly advantageous manner, the film has a cover layer and a security layer. The cover layer can be designed as a PET layer, by way of example. The separation layer can be constructed between the cover layer and the film carrier. In a particularly advantageous manner, the film carrier is designed as a PET layer.

The security layer can be constructed as a lacquer coat. The security layer can additionally have a metalized stamping for the purpose of increasing the counterfeit protection of the security card.

Pairs of rollers arranged opposing each other, or also flat press dies, can be used for the purpose of pressing the arrangement of the card body with the film applied to the card body and the adhesive agent positioned between the same, with at least some pressing force. It is essential in this process that, following the pressing, an edge region of the surface of the card body which is not covered by the film is also covered by a layer of the adhesive agent, and the edges of the film are enclosed by the adhesive agent and/or are embedded in the adhesive agent. In this case, following the pressing, or also during the pressing or also between individual steps of the pressing, the arrangement of the card body with the film applied to the card body and the adhesive agent positioned between the same is exposed to irradiation with electromagnetic waves, particularly light, and preferably through the film carrier and the film. UV light is used, in an ideal manner, for the irradiation. It can also be contemplated that the curing of the adhesive agent is initially only performed partially, to then subject the arrangement to a pressing and then a further irradiation and final curing. Any number of other sequences of the individual work steps can be contemplated.

The film can be provided in individual pieces, such that the same are guided to a gluing station and/or a joining station—each individually.

If the film which serves the purpose of providing a coating—by way of example as film patches—is provided via a film carrier, it is particularly advantageous if the film carrier is removed from the film and/or the film patch connected to the card body, prior to, during, or after the curing of the adhesive agent. In this way, the film carrier, as a continuous web, can be removed from the arrangement and/or from the card body, and rolled on a downstream roller for disposal purposes. In parallel to this process, the coated card body can be conveyed further—preferably linearly—for further manipulation and/or processing.

In addition, it can be contemplated that the film and/or the film patches are processed prior to the application on the carrier. As such, the film could be lasered, perforated, stamped, or otherwise processed. In particular, it can be contemplated that the film is imprinted—preferably on the side facing the card body, prior to the application to the card body.

Finally, it is hereby expressly noted that the embodiments of the device according to the invention described above only serve the purpose of explaining the teaching as claimed, wherein said teaching is nevertheless not restricted to the embodiments.

LIST OF REFERENCE NUMBERS 1 security card
2 card body
3 film
4 adhesive agent
5 edge region
6 gluing station
7 joining station
8 curing station
9 film carrier
10 roll
11 UV light source
12 separating station
13 roll

The invention claimed is:

1. A method for the production of a security card (1) having a card body (2) and a film (3) which is irreversibly attached to the card body (2), said method comprising the steps of:
provision of the card body (2);
provision of the film (3), wherein at least one of a side or a surface of the film (3) that faces the card body (2) is at least slightly smaller than at least one of a side or a surface of the card body (2) that faces the film (3);
coating of at least one of the card body (2) or the film (3) with a transparent adhesive agent (4);
at least one of combining or pressing of the card body (2) and the film (3) such that an edge region (5) of the surface of the card body (2) which is not covered by the film (3) is also covered by a layer of the adhesive agent (4), and the edges of the film (3) are at least one of enclosed by or embedded in the adhesive agent (4); and
curing of the adhesive agent (4) by an application of electromagnetic waves.

2. A method according to claim 1, wherein the security card is at least one of a finance card or a card for the purpose of identification.

3. A method according to claim 1, wherein the application of electromagnetic waves is via an application of light.

4. A method according to claim 1, wherein the adhesive agent (4) is applied to at least one of the card body (2) or the film (3) via digital printing.

5. A method according to claim 1, wherein the adhesive agent (4) is applied to at least one of the card body (2) or the film (3) via a drop-on-demand process.

6. A method according to claim 1, wherein a UV-curable glue is used as the adhesive agent (4).

7. A method according to claim 1, wherein at least one of: the card body (2) is personalized via digital printing; or information is marked on the card body (2) by a laser.

8. A method according to claim 7, wherein the digital printing is a drop-on-demand process and the laser is a grayscale laser.

9. A method according to claim 1, wherein the film (3) is provided as individual film patches on a film carrier (9).

10. A method according to claim 9, wherein the separation layer is included between the film carrier (9) and the film (3), such that the film (3) can be removed from the film carrier (9).

11. A method according to claim 1, characterized in that the film (3) has a cover layer and a security layer.

12. A method according to claim 11, wherein the security layer is designed as a lacquer coat.

13. A method according to claim 11, wherein the security layer has a metalized stamping.

14. A security card (1), particularly a finance card or a card for the purpose of identification, preferably an ID card, wherein the same is a personal identification card or another identification card, access authorization card, etc., by way of example, and the security card (1) has a card body (2) and a film (3) which is irreversibly attached to the card body (2), wherein an edge region (5) of the surface of the card body (2) which is not covered by the film (3) is also covered by a layer of a transparent adhesive agent (4) which cures upon the application of electromagnetic waves, and the edges of the film (3) are at least one of enclosed by the adhesive agent (4) or embedded in the adhesive agent (4), wherein said security card is produced according to a method according to claim 1.

* * * * *